United States Patent Office

Re. 26,590
Reissued May 27, 1969

26,590

COMPOUND OF BETAINE AND CHLORAL AND METHOD FOR PREPARING SAME

Vladimir Petrow, Alan Jeffery Thomas, and Oliver Stephenson, London, England, assignors to The British Drug Houses Limited (of 1964), London, England No Drawing. Original No. 3,028,420, dated Apr. 3, 1962, Ser. No. 33,637, June 3, 1960. Application for reissue Feb. 6, 1964, Ser. No. 348,838

Int. Cl. C07c *101/12, 101/10;* A61k *24/00*

U.S. Cl. 260—501.13 4 Claims

Matter enclosed in heavy brackets [ ] appears in the original patent but forms no part of this reissue specification; matter printed in italics indicates the additions made by reissue.

*ABSTRACT OF THE DISCLOSURE*

*A compound of the empirical formula $C_7H_{14}O_4NCl_3$ derived from betaine and chloral having hypnotic and sedative properties, and process for its preparation.*

This invention relates to organic compounds and has particular reference to a new compound of betaine and chloral.

It is an object of the present invention to provide a new compound of the empirical formula $C_7H_{14}O_4NCl_3$, which is of value on account of its hypnotic and sedative properties, and a process for its preparation.

It is a further object of the present invention to provide pharmaceutical preparations of the new compound, and in particular to provide solid preparations comprising tablets, granules, capsules and suppositories.

It is well known to those skilled in the art that choral and its hydrate are among the cheapest and safest hypnotic agents available at the present time. Their clinical utilisation, however, is handicapped by the nauseating odour and unpleasant taste. For this reason many attempts have been made in the past to combine chloral with a physiologically inert substance in order to produce a solid preparation which is essentially free from the unpleasant characteristics of chloral itself. These attempts have been hitherto only partially successful, and such combinations as chloral-dimethylformamide have found only limited application in medicine.

We have made the unexpected discovery that chloral and its hydrate combine exothermically with betaine, a physiologically inactive, naturally-occurring base, to form a new compound of empirical formula $C_7H_{14}O_4NCl_3$, which may be obtained in crystalline form from solvents such for example as water or ethanol. Infrared examination of this new compound reveals that it no longer possesses the hydroxyl bands characteristic of chloral hydrate, but only a shoulder on the high frequency side of the main band of the dispersing medium (viz. liquid paraffin B.P.) at 3000 cm.$^{-1}$, and one broad carbonyl band at 1615 cm.$^{-1}$ (betaine carboxylate). This indicates strong hydrogen-bonding between the hydroxyl groups of chloral hydrate and the $$COO^-$$

group of betaine which is held with charge by the stable positive $$-\overset{+}{N}(CH_3)_3$$

group. This new compound is probably 6-trichloromethyl-4,8-dihydra - 1,3,5,7 - tetroxacycloöct-2-ato-trimethylammoniomethane of formula:

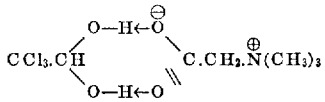

which formula represents a structural type hitherto unknown in organic chemistry.

According to the present invention there is provided a compound of betaine or betaine hydrate and chloral or chloral hydrate having the empirical formula $$C_7H_{14}O_4NCl_3$$

and M.P. 122.5° to 124.5° C.

The invention also provides a process for the preparation of a compound of betaine or betaine hydrate and chloral or chloral hydrate having the empirical formula $C_7H_{14}O_4NCl_3$ which process comprises reacting chloral or chloral hydrate with betaine or betaine hydrate in approximately molar proportions. A mixture of chloral or chloral hydrate and betaine or betain hydrate may conveniently be warmed carefully to ca. 60° C. when an exothermic reaction occurs which is completed by heating for a short time. The residual solid is crystallised from water or ethanol to give the new compound in high yield.

Alternatively, a solution of betaine hydrochloride in a minimum of water may be neutralised with sodium carbonate or other alkali or alkaline earth hydroxide or carbonate for example sodium hydroxide, potassium hydroxide, potassium carbonate or calcium hydroxide, and the solution treated with a molar equivalent of chloral or chloral hydrate. Reaction is completed by warming for a short time and the product is isolated by cooling.

The new compound according to the present invention separates from solvents such for example as water or ethanol in the form of large crystals of M.P. 122.5° to 124.5° C. (corr.). These crystals are free from the odour of chloral and its hydrate. The new compound may be converted into pharmaceutical preparations such as tablets, which tablets are free from chloral-like odour and when taken with a glass of water are essentially free from unpleasant chloral-like taste. The new compound is fully effective clinically as an hypnotic agent and thus represents a new and significant advance in chloral therapy.

Following is a description by way of example of methods of carrying the invention into effect.

Example 1

An intimate mixture of betaine hydrate (67.5 g.) and chloral hydrate (100 g.) was warmed to ca. 60° C. when an exothermic reaction occurred and the mixture became pasty. It was then stirred at 60° C. for 30 minutes. The residue solidified on cooling and was crystallised from a small amount of water. The product separated in hard, colourless prisms of M.P. 122.5 to 124.5° C. (corr.).

Example 2

The reaction described in Example 1 was carried out in exactly the same way except that anhydrous betaine (58.5 g.) was used in place of betaine hydrate. The product, isolated by crystallisation from ethanol had M.P. 122.5 to 124.5° C. (corr.).

Example 3

A solution of betaine hydrochloride (15.4 g.) in water (20 ml.) was treated with sodium carbonate (6.0 g.) and the solution warmed gently until evolution of carbon dioxide was complete. Chloral hydrate (16.6 g.) was then added and the solution warmed at 70 to 80° C. for 10 minutes. The product separated after cooling overnight at 0° C. It was purified by crystallisation from the minimum of water and had M.P. 122.5° to 124.5° C. (corr.).

Example 4

| | |
|---|---|
| $C_7H_{14}O_4NCl_3$, powdered | 518 g. |
| Maize starch | 74.5 g. |
| Lactose, powdered | 112 g. |
| Ethyl cellulose, 10% w./v. solution of industrial alcohol | A sufficient quantity. |
| Magnesium stearate | 7.5 g. |
| Maize starch, sufficient to produce | 745 g. |

The first three ingredients were thoroughly mixed and granulated with the alcoholic solution of ethyl cellulose, followed by air-drying. The resultant granule was processed through a 20 mesh sieve and the lubricant (magnesium stearate) added, together with sufficient starch to produce the required weight, 1000 tablets each weighing 745 mg. were compressed from the mixture.

Example 5

| | |
|---|---|
| $C_7H_{14}O_4NCl_3$, powdered | 518 g. |
| Silica, finely divided (aerogel) | 30 g. |
| Maize starch | 66.5 g. |
| Polyethylene glycol 6000, 40% w./v. solution in chloroform | A sufficient quantity. |
| Magnesium stearate | 6.6 g. |
| Maize starch, sufficient to produce | 664 g. |

The first three ingredients were thoroughly mixed and granulated with the alcoholic solution of polyethylene glycol 6000, followed by air-drying. The resultant granule was processed through a 20 mesh sieve and the lubricant (magnesium stearate) added, together with sufficient starch to produce the required weight. 1000 tablets each weighing 664 mg. were compressed from the mixture.

In Examples 4 and 5 the tablets each contained 300 mg. (approximately 5 grains) of chloral hydrate.

Example 6

| For 10 suppositories: | G. |
|---|---|
| $C_7H_{14}O_4UCl_3$ | 0.6 |
| White beeswax | 0.6 |
| Cocoa butter | 11.7 |

The finely powdered $C_7H_{14}O_4NCl_3$ was triturated to a smooth paste with a portion of the melted white beeswax and cocoa butter. The triturate was added to the remander of the melted cocoa butter and white beeswax with constant stirring, and the resultant suspension poured into previously calibrated moulds.

We claim:

1. A process for the preparation of a compound of betaine and chloral having the empirical formula $$C_7H_{14}O_4NCl_3$$

which process comprises reacting chloral hydrate with a compound selected from the group consisting of betaine and betaine hydrate in approximately molar proportions, said reaction being carried out by mixing said reactants and warming the mixture until exothermic reaction takes place.

2. A process as claimed in claim 1 wherein a mixture of a compound selected from the group consisting of betaine and betaine hydrate and chloral hydrate is warmed to approximately 60° C.

3. A process as claimed in claim 1 wherein a solution of betaine hydrochloride in a minimum of water is neutralised with a compound selected from the group consisting of alkali and alkaline earth hydroxides and carbonates, the solution treated with a molar equivalent of chloral hydrate and warmed.

[4. The compound of betaine and chloral produced by the process of claim 1, said compound having the empirical formula $C_7H_{14}O_4NCl_3$ and M.P. 122.5° to 124.5° C.]

*5. A compound having the empirical formula*

$$C_7H_{14}O_4NCl_3$$

*corresponding to an equimolar ratio of chloral, betaine, and water, said compound having the hypnotic and sedative properties of chloral while being essentially free from unpleasant chloral-like taste and odor, said compound on infra-red examination in liquid paraffin as the dispersing medium having no hydroxyl bands characteristic of chloral hydrate, but only a shoulder on the high frequency side of the main band of the dispersing medium at 3000 cm.$^{-1}$, and one broad carbonyl band at 1615 cm.$^{-1}$, and said compound being crystallizable from water and ethanol in the form of crystals having a melting point of 122.5° C. to 124.5° C.*

References Cited

The following references, cited by the Examiner, are of record in the patented file of this patent or the original patent.

Carron: Chemical Abstracts, vol. 61, column 15942 (1964).

LEON ZITVER, *Primary Examiner.*

M. W. GLYNN, *Assistant Examiner.*

U.S. Cl. X.R.

260—601; 424—316